United States Patent
Chen et al.

(10) Patent No.: US 8,619,223 B2
(45) Date of Patent: Dec. 31, 2013

(54) THIN FILM TRANSISTOR SUBSTRATE AND LCD PANEL

(75) Inventors: Ying-Jen Chen, Miao-Li County (TW); Young-Ran Chuang, Jinming Township, Kinmen County (TW); Chih-Yung Hsieh, Miao-Li County (TW); Chien-Hong Chen, Miao-Li County (TW); Ju-Hsien Chen, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 359 days.

(21) Appl. No.: 12/787,585

(22) Filed: May 26, 2010

(65) Prior Publication Data

US 2010/0302472 A1    Dec. 2, 2010

(30) Foreign Application Priority Data

May 27, 2009 (TW) ............................... 98117867 A

(51) Int. Cl.
*G02F 1/1343* (2006.01)
(52) U.S. Cl.
USPC .......................................................... 349/139
(58) Field of Classification Search
USPC .......................................................... 349/139
See application file for complete search history.

(56) References Cited

U.S. PATENT DOCUMENTS

| | | | |
|---|---|---|---|
| 8,102,498 B2 * | 1/2012 | Kanaya et al. ................. | 349/155 |
| 2004/0257513 A1 * | 12/2004 | Chin et al. .................... | 349/142 |
| 2005/0253797 A1 | 11/2005 | Kamada et al. | |
| 2006/0054890 A1 * | 3/2006 | Wu et al. .......................... | 257/59 |
| 2008/0278651 A1 * | 11/2008 | Lee et al. ......................... | 349/43 |
| 2009/0079892 A1 * | 3/2009 | Hsien et al. ..................... | 349/47 |
| 2009/0230396 A1 * | 9/2009 | Na et al. .......................... | 257/59 |
| 2009/0290114 A1 * | 11/2009 | Na et al. ........................ | 349/139 |
| 2009/0310049 A1 * | 12/2009 | Hsu et al. ......................... | 349/38 |
| 2010/0033643 A1 * | 2/2010 | Horiuchi et al. ................. | 349/38 |
| 2010/0097555 A1 * | 4/2010 | Huang et al. .................. | 349/139 |

FOREIGN PATENT DOCUMENTS

| | | |
|---|---|---|
| TW | 200537205 | 2/2005 |
| TW | 200846750 | 9/2007 |
| TW | 200914965 | 9/2007 |

OTHER PUBLICATIONS

English Abstract translation of TW200537205 (Published Feb/ 23, 2005).
English Abstract translation of TW200914965 (Published Sep. 20, 2007).
English Abstract translation of TW200846750 (Published Sep. 19, 2007).
TW Office Action dated Sep. 21, 2012.

* cited by examiner

*Primary Examiner* — Eric Wong
(74) *Attorney, Agent, or Firm* — McClure, Qualey & Rodak, LLP

(57) ABSTRACT

A thin film transistor (TFT) substrate includes a substrate, data lines, scan lines and pixel electrodes. The data lines and the scan lines intersect each other on the substrate for defining pixel areas. The pixel electrodes are disposed in corresponding pixel areas. Each of the pixel electrodes defines at least two slits by which the pixel electrode is divided into at least two first areas and at least two second areas. The first areas and the second areas are insulated with respect to each other. The first areas are disposed diagonally and the second areas are disposed diagonally.

12 Claims, 6 Drawing Sheets

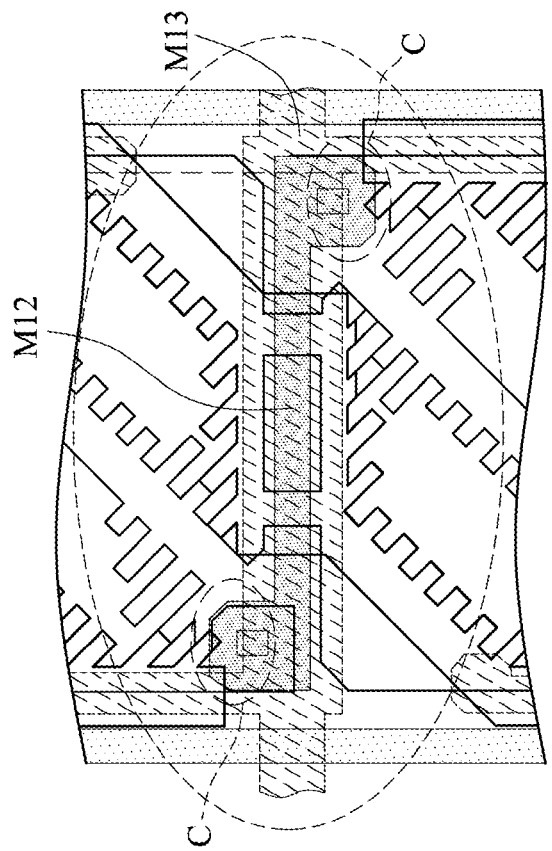
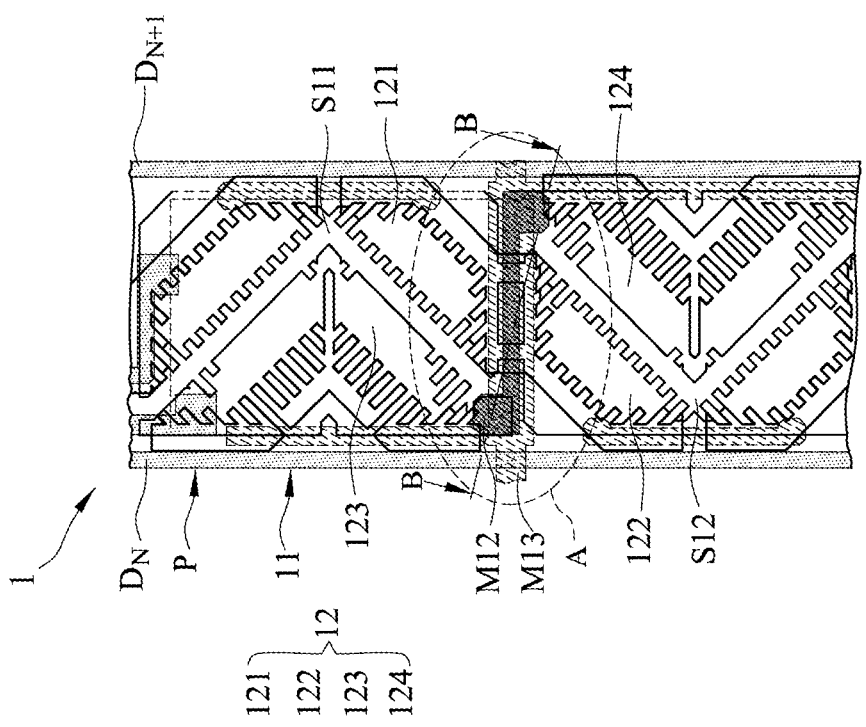
FIG. 2B
FIG. 2A

THIN FILM TRANSISTOR SUBSTRATE AND LCD PANEL

BACKGROUND

1. Field

The disclosure relates to a liquid crystal display (LCD) panel and, in particular, to a LCD panel and the thin film transistor substrate thereof.

2. Related Art

LCD apparatuses, having advantages such as low power consumption, less heat, light weight and non-radiation, are increasingly included in various electronic products and are gradually replacing cathode ray tube (CRT) display apparatuses.

In general, an LCD apparatus comprises an LCD panel and a backlight module. The LCD panel has a thin film transistor (TFT) substrate, a color filter (CF) substrate and a liquid crystal layer between the two substrates, and a plurality of pixel areas are formed in an array by the substrates and the liquid crystal layer. The backlight module makes the light emitted from a light source averagely spread to the LCD panel, and the pixels thus display various colors to form an image. However, when people watch the LCD panel in different angles (such as in a front or a side angle), the voltage-transmittance curve of the liquid crystal of the pixel will vary depending on the viewing angle, thereby causing a color shift effect on the LCD apparatuses.

To reduce the color shift effect, some technologies have been developed. In many of those technologies, a single pixel is divided into a dark region and a light region, and these two regions have different voltage-transmittance curves corresponding to front and side viewing angles. Accordingly, the low color shift (LCS) can be achieved through the compensation of the curves by the dark region and the light region.

For technologies including a vertical division of a pixel electrode, as shown in FIG. 1A, the pixel electrode is divided into a light region A1 and a dark region A2 that are placed at an upper position and a lower position, respectively. However, when the pixel electrode is vertically divided, a viewer will see mesh mura when pixels displaying according to lower gray values.

For technologies including a horizontal division of a pixel electrode, as shown in FIG. 1B, the pixel electrode is divided into a light region A1 and a dark region A2 that are placed at a left position and a right position, respectively. In this case, because only the light region A1 or the dark region A2 is placed at a side of boundary of the pixel, the boundary of the pixel is easier to manage and thus better efficiency of the liquid crystal can be achieved. However, if the pixel electrode is horizontally divided, when signals of negative polarity transmitted on the data lines at two sides of the pixel change simultaneously, one side of the pixel is affected by a stronger capacitance coupling effect so that parasitic capacitances at two sides of the pixel are unbalanced.

For technologies including a surrounding division of a pixel electrode, as shown in FIG. 1C, the pixel electrode is divided into a light region A1 and a dark region A2 that surrounds the light region A1. If the pixel electrode includes a surrounding division, although the pixel will obtain balanced effects from the data lines, the efficiency and transmittance of liquid crystal are decreased because the boundary between the light region A1 and the dark region A2 is longer.

SUMMARY

Embodiments described in the present disclosure provide a thin film transistor substrate and an LCD panel. Briefly described, in one embodiment, among others, an LCD panel comprises a first substrate, a second substrate, and a liquid crystal layer sandwiched between the first substrate and the second substrate. The LCD panel further includes a plurality of data lines and scan lines that intersect each other on the first substrate for defining a plurality of pixel areas, and the LCD panel also includes a plurality of pixel electrodes disposed in corresponding pixel areas. Each of the pixel electrodes defines at least two slits that divide the pixel electrode into at least two first areas and at least two second areas. The first areas and the second areas are insulated with respect to each other, and the first areas are disposed diagonally and the second areas are disposed diagonally.

In another embodiment, among others, a TFT substrate comprises a substrate, a plurality of data lines and scan lines that intersect each other on the substrate that define a plurality of pixel areas. The TFT substrate further includes a plurality of pixel electrodes disposed in corresponding pixel areas. The pixel electrodes are formed by a first conductive layer, and each of the pixel electrodes defines at least two slits that divide the pixel electrode into a least one first area and at least two second areas. The first area separates the two second areas, and the two second areas are electrically connected by a second conductive layer. The first area and the two second areas are insulated with respect to each other.

In yet another embodiment, among others, an LCD panel comprises a first substrate, a second substrate, a liquid crystal layer sandwiched between the first substrate and the second substrate, and a plurality of data lines and scan lines that intersect each other on the first substrate that define a plurality of pixel areas. The LCD panel further comprises a plurality of pixel electrodes disposed in corresponding pixel areas. The pixel electrodes are formed by a first conductive layer, and each of the pixel electrodes define at least two slits that divide the pixel electrode into at least one first area and at least two second areas. The first area separates the two second areas, the two second areas are electrically connected by a second conductive layer, and the first area and the second areas are insulated with respect to each other.

Other features and embodiments described in the present disclosure will be or become apparent to one of skill in the art upon examination of the following drawings and detailed description. It is intended that such features and embodiments be included within this description, be within the scope of the present disclosure, and be protected by the accompanying claims.

BRIEF DESCRIPTION OF THE DRAWINGS

The disclosure will become better understood from the detailed description and accompanying drawings, which are given for illustration only, and thus are not limitative of the present disclosure, and wherein:

FIGS. 2A to 2B are schematic diagrams showing portions of an LCD panel according to a first embodiment;

DETAILED DESCRIPTION

Figure 1A:
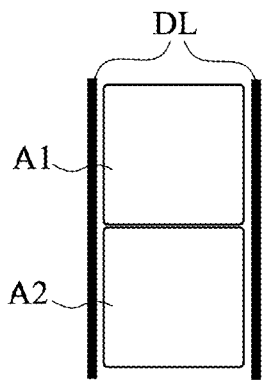
FIGS. 1A to 1C are schematic diagrams showing various divisions of a pixel electrode.
Figure 1B:
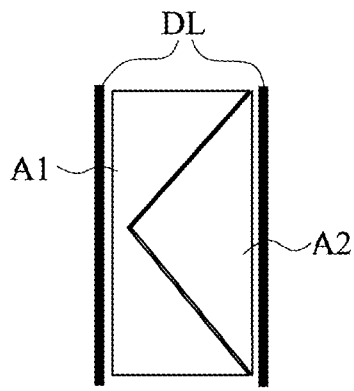
Figure 1C:
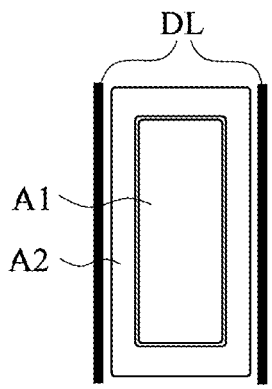

The present disclosure will be apparent from the following detailed description, which proceeds with reference to the accompanying drawings, wherein the same references relate to the same elements.

First Embodiment

FIG. 2A is a schematic diagram showing a layout of a single pixel area P of the thin film transistor (TFT) substrate 1 of a liquid crystal display (LCD) panel according to a first embodiment of the disclosure. FIG. 2B is a schematic view of an enlargement of the area A in FIG. 2A. The LCD panel can further include a color filter (CF) substrate (not shown) and a liquid crystal layer (not shown) that is sandwiched between the two substrates.

The TFT substrate 1 includes a substrate 11, a plurality of data lines $D_N$, $D_{N+1}$, a plurality of scan lines (not shown) and a plurality of pixel electrodes 12. The substrate 11 is a glass substrate on which the data lines and the scan lines intersect to define a plurality of pixel areas P, and the data lines and the scan lines are disposed around the pixel areas P.

The pixel electrodes 12 are disposed in corresponding pixel areas P. The pixel electrodes 12 are formed by a first conductive layer that is a transparent electrode layer including, for example, indium-tin oxide (ITO), indium-zinc oxide (IZO), aluminum-zinc oxide (AZO), gallium-zinc oxide (GZO), zinc oxide (ZnO), or one or more of a variety of other oxides.

The pixel electrode 12 defines at least two slits S11, S12 that divide the pixel electrode 12 into at least two first areas 121, 122 and at least two second areas 123, 124. The first areas 121, 122 and the second areas 123, 124 are insulated with respect to each other. The first areas 121, 122 are disposed diagonally, and the second areas 123, 124 are disposed diagonally, too. The first areas 121, 122 can be a dark region, and the second areas 123, 124 can be a light region, or vice versa. The first areas 121, 122 and the second areas 123, 124 can be respectively formed in any shape, such as a strip or "<". The first areas 121, 122 and the second areas 123, 124 here are respectively shaped like "<".

From another point of view, the slits S11, S12 as shown in FIG. 2A divide the pixel electrode into at least a first area and at least two second areas, and the first area (consists of the areas 121, 122) separates the second areas 123, 124. The first area consists of the areas 121, 122 and the first conductive layer that electrically connects to the areas 121, 122. The second areas 123, 124 are electrically connected by a second conductive layer M12. The second conductive layer M12 may include the first metal layer (so-called M1 layer) or the second metal layer (so-called M2 layer) in the TFT process.

Figure 3A:
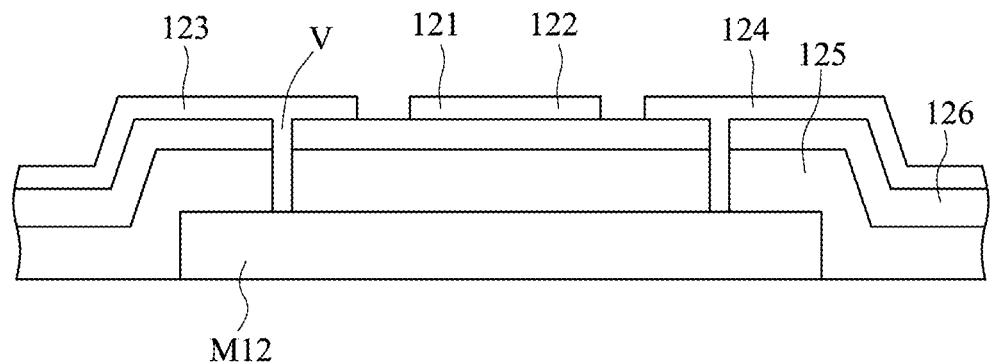
FIGS. 3A to 3C are schematic diagrams showing examples of a cross-section along B-B of the portions of the LCD panel illustrated in FIGS. 2A and 2B.
Figure 3B:
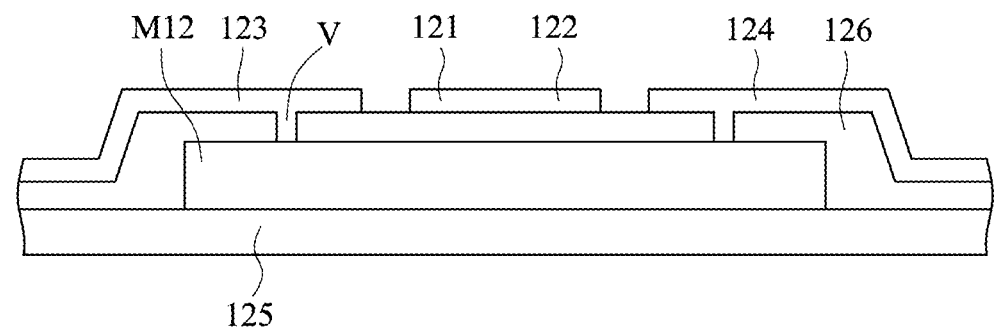
Figure 3C:
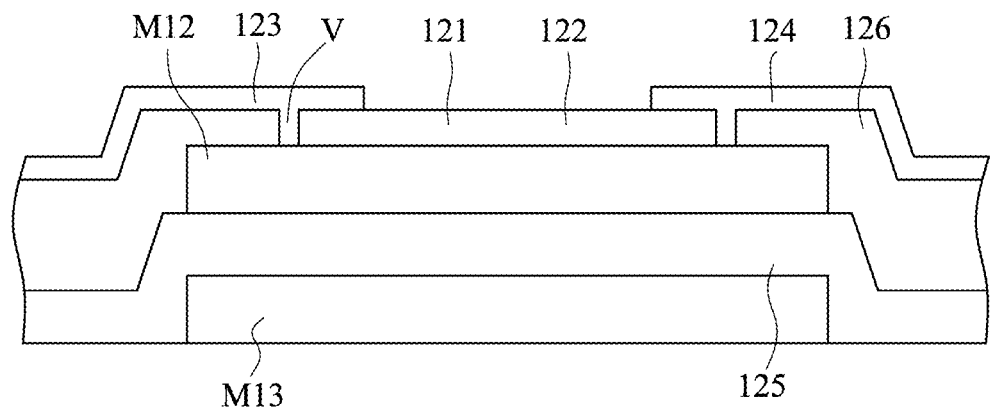

FIGS. 3A to 3C show various aspects of the sectional diagram taken along the section B-B in FIG. 2A. As shown in FIG. 3A, the second conductive layer M12, for example, includes the first metal layer (M1) in the TFT process. An insulating layer (e.g. SiN) 125 and a passivation layer 126 are sequentially disposed on the second conductive layer M12. The second areas 123, 124 are electrically connected to the second conductive layer M12 by conductive vias V.

As shown in FIG. 3B, the second conductive layer M12, for example, includes the second metal layer (M2) in the TFT process. The second areas 123, 124 are electrically connected with the second conductive layer M12 by conductive vias V.

As shown in FIG. 3C, the second conductive layer M12 is stacked on a third conductive layer M13 with an insulating layer 125 therebetween. Accordingly, the second conductive layer M12 and the third conductive layer M13 can form a storage capacitance. Therefore, other storage capacitances can be decreased in size, and the aperture ratio of the pixel can be thus increased. In this case, the second conductive layer M12 is of so-called M2 layer in the TFT process, and the third conductive layer M13 is of so-called M1 layer in the TFT process.

Furthermore, referring to FIG. 3C in conjunction with FIG. 2B, the second conductive layer M12 can extend beyond the third conductive layer M13, and the portions C extending beyond the third conductive layer M13 are symmetrical. Thereby, if the second conductive layer M12 or the third conductive layer M13 shifts due to process variability, the portions C can assure the same capacitance formed by the second conductive layer M12 and the third conductive layer M13 with a self-compensation effect. In addition, the portions C can make the second conductive layer M12 electrically connect to the first conductive layer through laser before the conductive via V is formed.

Second Embodiment

Figure 4A:
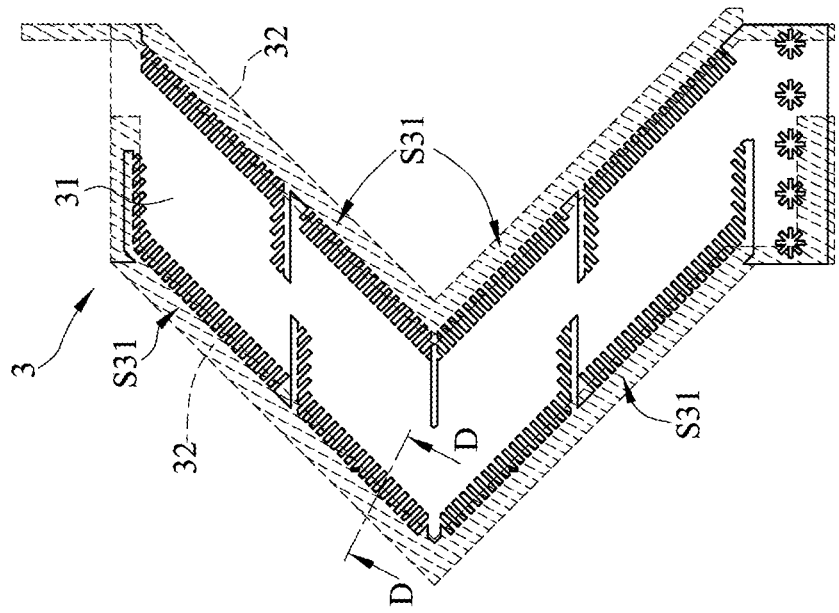
FIGS. 4A to 4B are schematic diagrams of portions of an LCD panel according to a second embodiment.
Figure 4B:
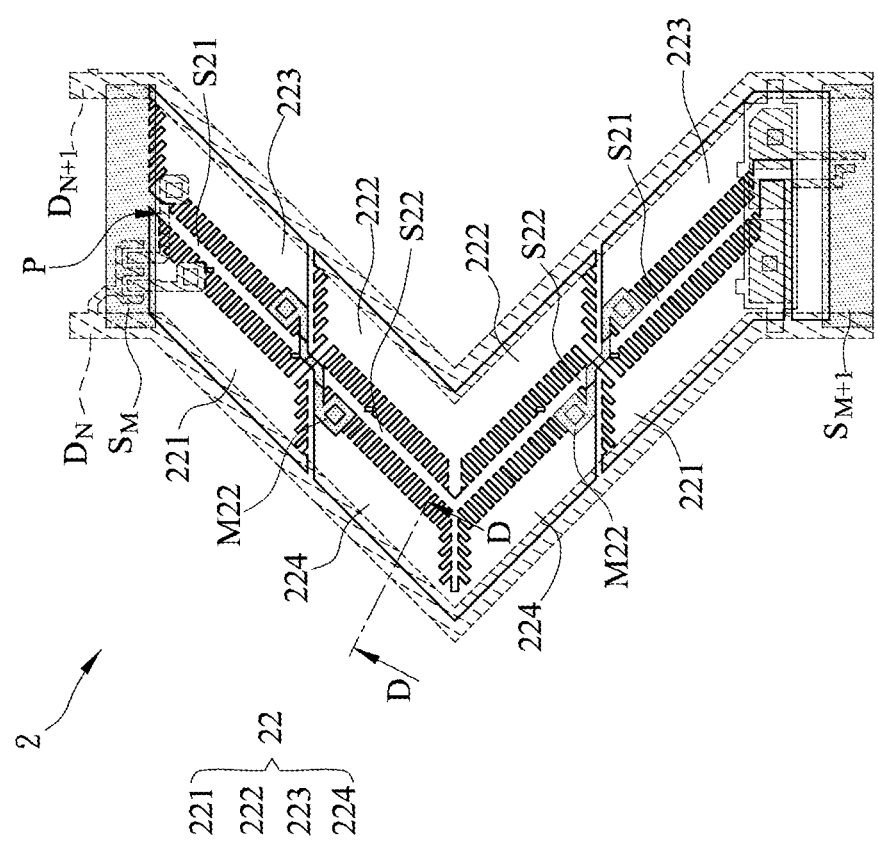

FIGS. 4A and 4B are schematic views showing portions of an LCD panel according to a second embodiment of the disclosure. The LCD panel includes a first substrate 2, a second substrate 3, and a liquid crystal layer (not shown) sandwiched between the first substrate 2 and the second substrate 3. FIG. 4A shows the first substrate 2, which is a TFT substrate, for example. FIG. 4B shows the second substrate 3, which is a CF substrate, for example.

As shown in FIG. 4A, a plurality of data lines $D_N$, $D_{N+1}$ and a plurality of scan lines $S_M$, $S_{M+1}$ are intersected with each other on the first substrate 2 to define a plurality of pixel areas P. FIG. 4A is a schematic view showing an example of a layout of a single pixel area P.

A plurality of pixel electrodes 22 are disposed in the pixel areas P correspondingly. In the embodiment, a pixel area P can be regarded as having two pixel electrodes 22 disposed symmetrically. The pixel electrode 22 is formed by a first conductive layer and defines two slits S21, S22 that divide the pixel electrode 22 into at least two first areas 221, 222 and at least two second areas 223, 224. The first areas 221, 222 and the second areas 223, 224 are insulated with respect to each other. The first areas 221, 222 are disposed diagonally, and the second areas 223, 224 are disposed diagonally. The first areas 221, 222 can be a dark region and the second areas 223, 224 can be a light region, and vice versa. The first areas 221, 222 and the second areas 223, 224 can be respectively formed in any shape, such as a strip or "<". The first areas 221, 222 and the second areas 223, 224 shown are respectively shaped like "<".

From another point of view, the slits S21, S22 as shown in FIG. 4A divide the pixel electrode 22 into at least a first area and at least two second areas, and the first area (consisting of the areas 221, 222) separates the second areas 223, 224. The first area consists of the areas 221, 222 and the first conductive layer that electrically connects to the areas 221, 222. The second areas 223, 224 are electrically connected by a second conductive layer M22. The second conductive layer M22 may include the first metal layer (so-called M1 layer) or the second metal layer (so-called M2 layer) in the TFT process. The various aspects of the second conductive layer M12 of FIGS. 3A to 3C discussed above are also applicable to the second conductive layer M22, so detailed descriptions are omitted here. Furthermore, the second conductive layer M22 and a third conductive layer can form a storage capacitance, wherein an insulating layer is disposed between them (referring to FIG. 3C).

As shown in FIG. 4B, the second substrate 3 of the embodiment is a CF substrate having a common electrode layer 31 and a light-shielding layer 32. The common electrode layer 31 is disposed opposite to the pixel electrodes 22, thereby forming pixel capacitances. The light-shielding layer 32 is, for example, a black matrix (BM) layer including chromium (Cr) or another anti-reflective material, and disposed around each of the pixel areas P.

Figure 5:
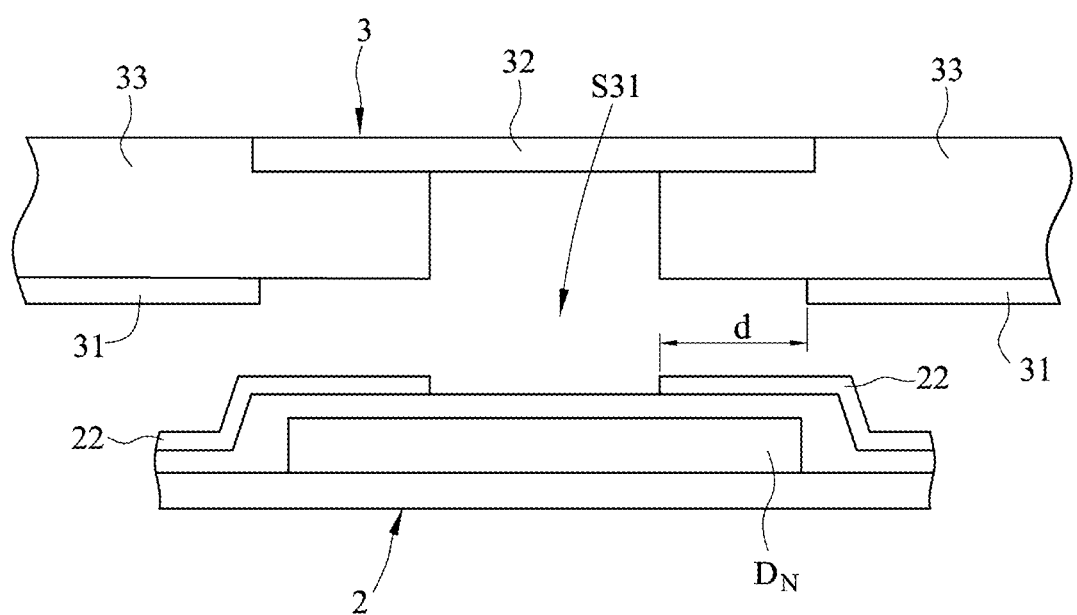
FIG. 5 is a schematic diagrams showing an example of a cross-section along D-D of the portions of LCD panel illustrated in FIGS. 4A and 4B.

Besides, the common electrode layer 31 has at least one slit S31 that overlaps the data lines $D_N$, $D_{N+1}$. FIG. 5 is a schematic view of a cross-section along D-D of the common electrode illustrated in FIGS. 4A and 4B. As shown in FIG. 5, the color filter layer 33 is disposed corresponding to each pixel area P. The slit S31 overlaps the data line $D_N$ and is covered by the light-shielding layer 32. Therefore, dark lines caused by the slit S31 will not occur in the pixel area P, so that transmittance can be increased, and the slit S31 can achieve multi-domain alignment.

Furthermore, a width of the slit S31 is larger than that of the data line $D_N$, so that the common electrode layer 31 does not overlap the data line $D_N$, thereby decreasing parasitic capacitance formed by the data line $D_N$ and the common electrode layer 31 and thus preventing the data signal from distortion by resistance-capacitance effect. In the embodiment, the pixel electrode 22 overlaps the data line $D_N$, and a horizontal distance d between the edge of the common electrode layer 31 at the slit S31 and the edge of the pixel electrode 22 is between 4 microns and 8 microns. If the edge of the common electrode layer 31 is too far from the edge of the pixel electrode 22, the pixel capacitance will be lowered, and the dark line caused by the slit S31 will become larger and even extend beyond the light-shielding layer 32 to decrease transmittance of the display panel. If the edge of the common electrode layer 31 is too close to the edge of the pixel electrode 22, a capacitance coupling effect caused by the common electrode layer 31 and the data line $D_N$ will occur. This capacitance coupling effect will cause the liquid crystal to become misaligned, decreasing the efficiency of the liquid crystal and transmittance of the display panel. So, the edge of the common electrode layer 31 and the edge of the pixel electrode 22 should be spaced at a suitable interval, such as a spacing of between 4 microns and 8 microns as shown in the embodiment.

Third Embodiment

Figure 6A:
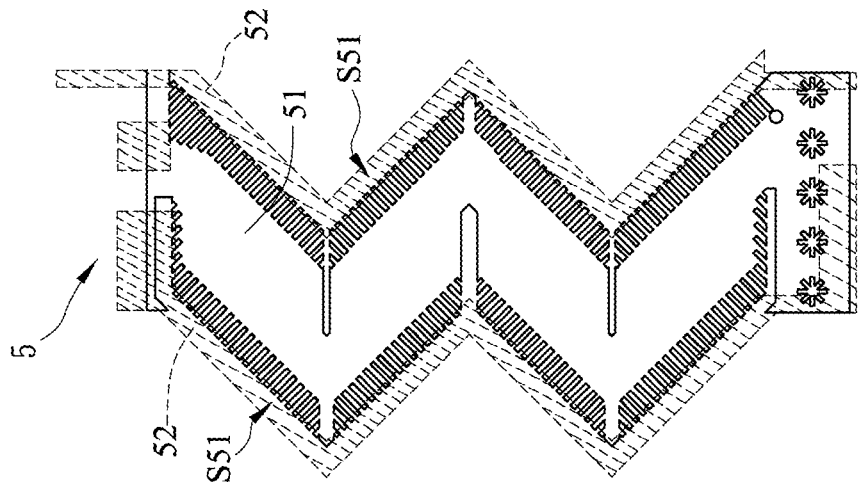
FIGS. 6A and 6B are schematic diagrams of portions of an LCD panel according to the third embodiment.
Figure 6B:
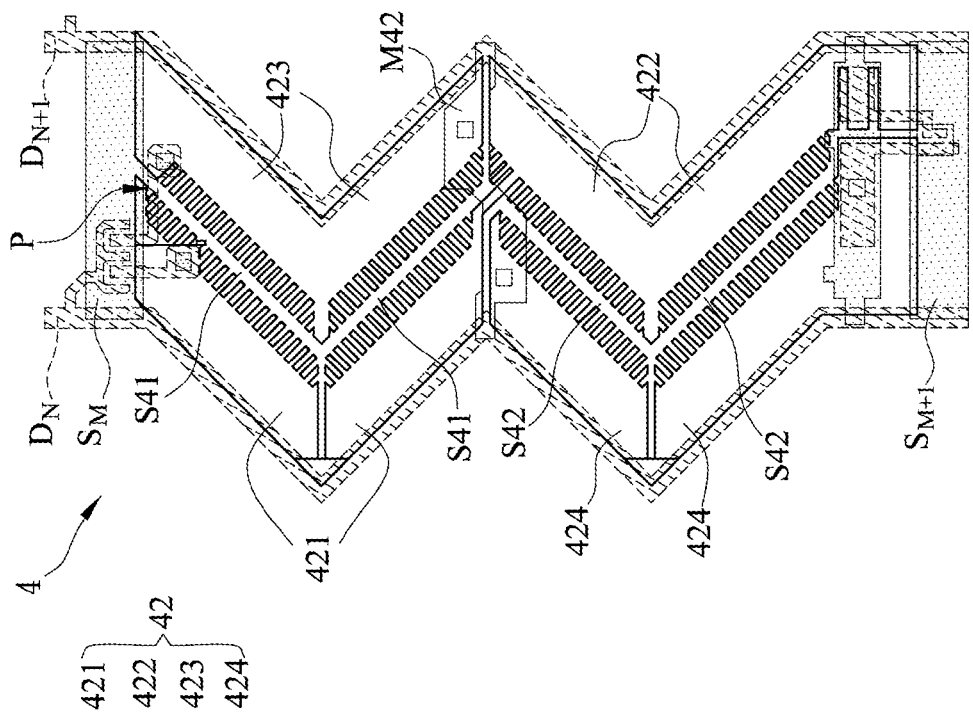

FIGS. 6A and 6B are schematic views showing an LCD panel according to the third embodiment of the disclosure. The LCD panel includes a first substrate 4, a second substrate 5 and a liquid crystal layer (not shown) sandwiched between the first substrate 4 and the second substrate 5. FIG. 6A shows the first substrate 4, which is a TFT substrate, as an example. FIG. 6B shows the second substrate 5, which is a CF substrate, as an example.

As shown in FIG. 6A, a plurality of data lines $D_N$, $D_{N+1}$ and a plurality of scan lines $S_M$, $S_{M+1}$ intersect each other on the first substrate 4 to define a plurality of pixel areas P. FIG. 6A is a schematic view showing a layout of a single pixel area P.

A plurality of pixel electrodes 42 are disposed in corresponding pixel areas P. The pixel electrode 42 is formed by a first conductive layer and defines two slits S41, S42 that divide the pixel electrode 42 into at least two first areas 421, 422 and at least two second areas 423, 424. The first areas 421, 422 and the second areas 423, 424 are insulated with respect to each other. The first areas 421, 422 are disposed diagonally, and the second areas 423, 424 are disposed diagonally. The first areas 421, 422 can be a dark region, and the second areas 423, 424 can be a light region, or vice versa. The first areas 421, 422 and the second areas 423, 424 can be respectively formed in any shape, such as a strip or "<". The first areas 421, 422 and the second areas 423, 424 shown are respectively shaped like "<".

From another point of view, the slits S41, S42 as shown in FIG. 6A divide the pixel electrode 42 into at least a first area and at least two second areas, and the first areas 421, 422 (the areas 421, 422 linked together also can be regarded as a single first area) separate the second areas 423, 424. The first areas 421, 422 are electrically connected by the first conductive layer, and the second areas 423, 424 are electrically connected by a second conductive layer M42. The second conductive layer M42 can be of the first metal layer (so-called M1 layer) or of the second metal layer (so-called M2 layer) in the TFT process. Various aspects of the second conductive layer M12 of FIGS. 3A to 3C described above are also applicable to the second conductive layer M42, so a detailed description is omitted here. Furthermore, the second conductive layer M42 and a third conductive layer can form a storage capacitance, wherein an insulating layer is disposed between them (referring to FIG. 3C).

As shown in FIG. 6B, the second substrate 5 of the embodiment is a CF substrate having a common electrode layer 51 and a light-shielding layer 52. The common electrode layer 51 is disposed opposite to the pixel electrodes 42, thereby forming pixel capacitances. The light-shielding layer 52 is, for example, a black matrix (BM) layer including chromium (Cr), or another anti-reflective material, and disposed around each of the pixel areas P.

Besides, the common electrode layer 51 has at least one slit S51 that overlaps the data lines $D_N$, $D_{N+1}$. The features of the slit S51 can be perceived by referring to FIG. 5 and the related description. The slit S51 can overlap the data line $D_N$ and be covered by the light-shielding layer 52. Therefore, dark lines caused by the slit S51 will not occur in the pixel area P, which thus increases transmittance, and the slit S51 can make multi-domain alignment. Furthermore, a width of the slit S51 can be larger than that of the data line $D_N$, thereby decreasing the parasitic capacitance created by the data line $D_N$ and the common electrode layer 51 and thus preventing the data signal from distortion.

As described above, according to a TFT substrate and an LCD panel of the disclosure, each of the pixel electrodes defines at least two slits that divide the pixel electrode into at least two first areas and at least two second areas, and the first areas are disposed diagonally and the second areas are disposed diagonally. The first areas can be a dark region (or light region) and the second areas can be a light region (or dark region). Accordingly, the disclosure uses a diagonal division of the pixel electrode to place the light region and the dark region. Therefore, the disclosure can prevent mesh mura caused by the vertical division of a pixel electrode, balance capacitance coupling caused by the change of signals on data lines at two sides of the pixel, and prevent longer boundary between the light and dark regions present in the surrounding division of pixel electrode.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A liquid crystal display panel, comprising:
   a first substrate;
   a second substrate having a common electrode;
   a liquid crystal layer sandwiched between the first substrate and the second substrate;
   a plurality of data lines and scan lines that intersect each other on the first substrate for defining a plurality of pixel areas; and
   a plurality of pixel electrodes disposed in corresponding pixel areas, wherein each of the pixel electrodes defines at least two slits that divide the pixel electrode into at least two first areas and at least two second areas, wherein the first areas and the second areas are insulated with respect to each other, and the first areas are disposed diagonally and the second areas are disposed diagonally;
   wherein the common electrode layer is opposite to the pixel electrodes; and
   wherein the common electrode layer has at least one second slit corresponding to one of the data lines, the second slit is disposed along and overlapping with the one of the data lines, and a horizontal distance between the edge of the common electrode layer at the second slit and the edge of the one of the pixel electrodes is between 4 microns and 8 microns.

2. The liquid crystal display panel as recited in claim 1, wherein the pixel electrodes are formed by a first conductive layer, and the second areas are electrically connected by a second conductive layer.

3. The liquid crystal display panel as recited in claim 2, wherein the second conductive layer is stacked on a third conductive layer with an insulating layer therebetween.

4. The liquid crystal display panel as recited in claim 1, wherein a width of the second slit is larger than that of the one of the data lines.

5. The liquid crystal display panel as recited in claim 1, wherein the first areas and the second areas are shaped like a strip or "<", respectively.

6. A liquid crystal display panel, comprising:
   a first substrate;
   a second substrate having a common electrode;
   a liquid crystal layer sandwiched between the first substrate and the second substrate;
   a plurality of data lines and scan lines that intersect each other on the first substrate that define a plurality of pixel areas; and
   a plurality of pixel electrodes disposed in corresponding pixel areas, wherein the pixel electrodes are formed by a first conductive layer, wherein each of the pixel electrodes defines at least two slits that divide the pixel electrode into at least one first area and at least two second areas, wherein the first area separates the two second areas, the two second areas are electrically connected by a second conductive layer, and the first area and the second areas are insulated with respect to each other;
   wherein the common electrode layer is opposite to the pixel electrodes; and
   wherein the common electrode layer has at least one second slit corresponding to one of the data lines, the second slit is disposed along and overlapping with the one of the data lines, and a horizontal distance between the edge of the common electrode layer at the second slit and the edge of the one of the pixel electrodes is between 4 microns and 8 microns.

7. The liquid crystal display panel as recited in claim 6, wherein the second conductive layer is stacked on a third conductive layer through an insulating layer.

8. The liquid crystal display panel as recited in claim 6, wherein a width of the second slit is larger than a width of the one of the data lines.

9. The liquid crystal display panel as recited in claim 6, wherein the first area is disposed in a manner that two parts of the first area are disposed diagonally, and the second areas are disposed diagonally.

10. The liquid crystal display panel as recited in claim 6, wherein the first area and the second areas are shaped like a strip or "<", respectively.

11. The liquid crystal display panel as recited in claim 4, wherein a width of the second slit is larger than that of the one of the data lines such that a projection of the common electrode layer is non-overlapping with a projection of the one of the data lines on a plane parallel to the first substrate.

12. The liquid crystal display panel as recited in claim 8, wherein a width of the second slit is larger than that of the one of the data lines such that a projection of the common electrode layer is non-overlapping with a projection of the one of the data lines on a plane parallel to the first substrate.

* * * * *